US012720618B2

(12) United States Patent
Wright et al.

(10) Patent No.: US 12,720,618 B2
(45) Date of Patent: Aug. 25, 2026

(54) DEVICES AND METHODS FOR IMPROVING PROXIMATE DEVICE CONTROL

(71) Applicant: ZEBRA TECHNOLOGIES CORPORATION, Lincolnshire, IL (US)

(72) Inventors: Mariya Wright, Cortland Manor, NY (US); Kenneth S. Bhella, Stony Brook, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 289 days.

(21) Appl. No.: 18/387,688

(22) Filed: Nov. 7, 2023

(65) Prior Publication Data

US 2025/0151129 A1 May 8, 2025

(51) Int. Cl.
*H04W 76/10* (2018.01)
*H04W 4/80* (2018.01)

(52) U.S. Cl.
CPC ............. *H04W 76/10* (2018.02); *H04W 4/80* (2018.02)

(58) Field of Classification Search
CPC ....... H04W 4/80; H04W 76/00; H04W 76/10; H04W 76/14; H04W 76/15
See application file for complete search history.

(56) References Cited

U.S. PATENT DOCUMENTS

| | | | | |
|---|---|---|---|---|
| 9,854,616 | B2 * | 12/2017 | Raphael | H04W 76/14 |
| 10,257,870 | B2 * | 4/2019 | Satoh | H04W 76/14 |
| 10,271,190 | B2 * | 4/2019 | Angelini | H04W 4/80 |
| 10,341,942 | B2 * | 7/2019 | Jung | H04W 4/80 |
| 2020/0068627 | A1 | 2/2020 | Do et al. | |
| 2021/0051473 | A1 | 2/2021 | Escott et al. | |
| 2021/0352002 | A1 | 11/2021 | Knode | |
| 2022/0361264 | A1 | 11/2022 | Burns et al. | |
| 2023/0328635 | A1 | 10/2023 | Detwiler et al. | |

OTHER PUBLICATIONS

International Search Report and Written Opinion for International Patent Application No. PCT/US2024/054352 mailed on Jan. 3, 2025.

* cited by examiner

*Primary Examiner* — Quochien B Vuong

(57) ABSTRACT

Devices and methods for improving proximate device control are disclosed herein. An example method includes receiving a signal from a proximate device when the proximate device satisfies a distance threshold. The signal may include a dataset corresponding to the proximate device, and the proximate device may have a primary connection to a primary device. The example method may further include analyzing the dataset to determine whether the proximate device requires control; and in response to determining that the proximate device requires control, establishing a secondary connection to the proximate device.

20 Claims, 5 Drawing Sheets

DEVICES AND METHODS FOR IMPROVING PROXIMATE DEVICE CONTROL

BACKGROUND

Modern scanning devices bring convenience, flexibility, and maneuverability to data capture workflows. These handheld scanning devices typically benefit from robust remote control/management capabilities. However, conventional techniques for controlling and/or managing such scanning devices remotely have various limitations. Accordingly, there is a need for devices and methods to quickly and efficiently control and manage scanning devices remotely, and thereby reduce/eliminate the impact of these limitations.

SUMMARY

In an embodiment, the present invention is a device for improving proximate device control. The device may comprise: one or more processors; and one or more memories storing instructions thereon that, when executed by the one or more processors, are configured to cause the device to: receive a signal from a proximate device when the proximate device satisfies a distance threshold, the signal including a dataset corresponding to the proximate device, and the proximate device having a primary connection to a primary device, analyze the dataset to determine whether the proximate device requires control, and in response to determining that the proximate device requires control, establish a secondary connection to the proximate device.

In a variation of this embodiment, the secondary connection may comprise at least one of: (i) an instant direct connection to the proximate device via a Bluetooth Low Energy (BLE) protocol having a first transmission size limit or (ii) a fast file transfer channel having a second transmission size limit. Further in this variation, the second transmission size limit is greater than the first transmission size limit.

In another variation of this embodiment, the instructions, when executed by the one or more processors, may further cause the device to: transmit a control instruction to the proximate device across the secondary connection to control the proximate device based on the dataset corresponding to the proximate device.

In yet another variation of this embodiment, the instructions, when executed by the one or more processors, may further cause the device to: receive a plurality of signals from a plurality of proximate devices when each respective proximate device satisfies the distance threshold, each respective signal of the plurality of signals including a respective dataset corresponding to the respective proximate device, analyze each respective dataset to determine a set of proximate devices from the plurality of proximate devices requiring substantially similar control, substantially simultaneously establish a respective secondary connection to each proximate device of the set of proximate devices, and transmit a control instruction to each proximate device of the set of proximate devices across the respective secondary connections to control each proximate device of the set of proximate devices.

In still another variation of this embodiment, the signal may be a BLE signal transmitted by the proximate device as a periodic beacon.

In yet another variation of this embodiment, the proximate device may be configured to transmit a first dataset across the primary connection to the primary device, and at least a portion of the first dataset is not included in the signal transmitted from the proximate device.

In still another variation of this embodiment, the control may include one or more of: (i) tracking a location of the proximate device, (ii) defining a geofence for the proximate device, (iii) querying attribute information or statistical information of the proximate device, (iv) retrieving a log file of the proximate device, (v) configuring a setting of the proximate device, (vi) updating firmware of the proximate device, and (vii) activating a function of the proximate device.

In another embodiment, the present invention is a computer-implemented method for improving proximate device control. The method may comprise: receiving a signal from a proximate device when the proximate device satisfies a distance threshold, the signal including a dataset corresponding to the proximate device, and the proximate device having a primary connection to a primary device; analyzing the dataset to determine whether the proximate device requires control; and in response to determining that the proximate device requires control, establishing a secondary connection to the proximate device.

In a variation of this embodiment, the secondary connection may comprise at least one of: (i) an instant direct connection to the proximate device via a Bluetooth Low Energy (BLE) protocol having a first transmission size limit or (ii) a fast file transfer channel having a second transmission size limit that is greater than the first transmission size limit.

In another variation of this embodiment, the computer-implemented method may further comprise: transmitting a control instruction to the proximate device across the secondary connection to control the proximate device based on the dataset corresponding to the proximate device.

In yet another variation of this embodiment, the computer-implemented method may further comprise: receiving a plurality of signals from a plurality of proximate devices when each respective proximate device satisfies the distance threshold, each respective signal of the plurality of signals including a respective dataset corresponding to the respective proximate device; analyzing each respective dataset to determine a set of proximate devices from the plurality of proximate devices requiring substantially similar control; substantially simultaneously establishing a respective secondary connection to each proximate device of the set of proximate devices; and transmitting a control instruction to each proximate device of the set of proximate devices across the respective secondary connections to control each proximate device of the set of proximate devices.

In still another variation of this embodiment, the signal may be a BLE signal transmitted by the proximate device as a periodic beacon.

In yet another variation of this embodiment, the proximate device may be configured to transmit a first dataset across the primary connection to the primary device, and at least a portion of the first dataset is not included in the signal transmitted from the proximate device.

In yet another embodiment, the present invention is a tangible machine-readable medium comprising instructions for improving proximate device control that, when executed, cause a machine to at least: receive a signal from a proximate device when the proximate device satisfies a distance threshold, the signal including a dataset corresponding to the proximate device, and the proximate device having a primary connection to a primary device; analyze the dataset to determine whether the proximate device requires control;

and in response to determining that the proximate device requires control, establish a secondary connection to the proximate device.

In a variation of this embodiment, the secondary connection may comprise at least one of: (i) an instant direct connection to the proximate device via a Bluetooth Low Energy (BLE) protocol having a first transmission size limit or (ii) a fast file transfer channel having a second transmission size limit that is greater than the first transmission size limit.

In another variation of this embodiment, the instructions, when executed, may further cause the machine to at least: transmit a control instruction to the proximate device across the secondary connection to control the proximate device based on the dataset corresponding to the proximate device.

In yet another variation of this embodiment, the instructions, when executed, may further cause the machine to at least: receive a plurality of signals from a plurality of proximate devices when each respective proximate device satisfies the distance threshold, each respective signal of the plurality of signals including a respective dataset corresponding to the respective proximate device; analyze each respective dataset to determine a set of proximate devices from the plurality of proximate devices requiring substantially similar control; substantially simultaneously establish a respective secondary connection to each proximate device of the set of proximate devices; and transmit a control instruction to each proximate device of the set of proximate devices across the respective secondary connections to control each proximate device of the set of proximate devices.

In still another variation of this embodiment, the signal may be a BLE signal transmitted by the proximate device as a periodic beacon.

In yet another variation of this embodiment, the proximate device may be configured to transmit a first dataset across the primary connection to the primary device, and at least a portion of the first dataset is not included in the signal transmitted from the proximate device.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Figure 1A:
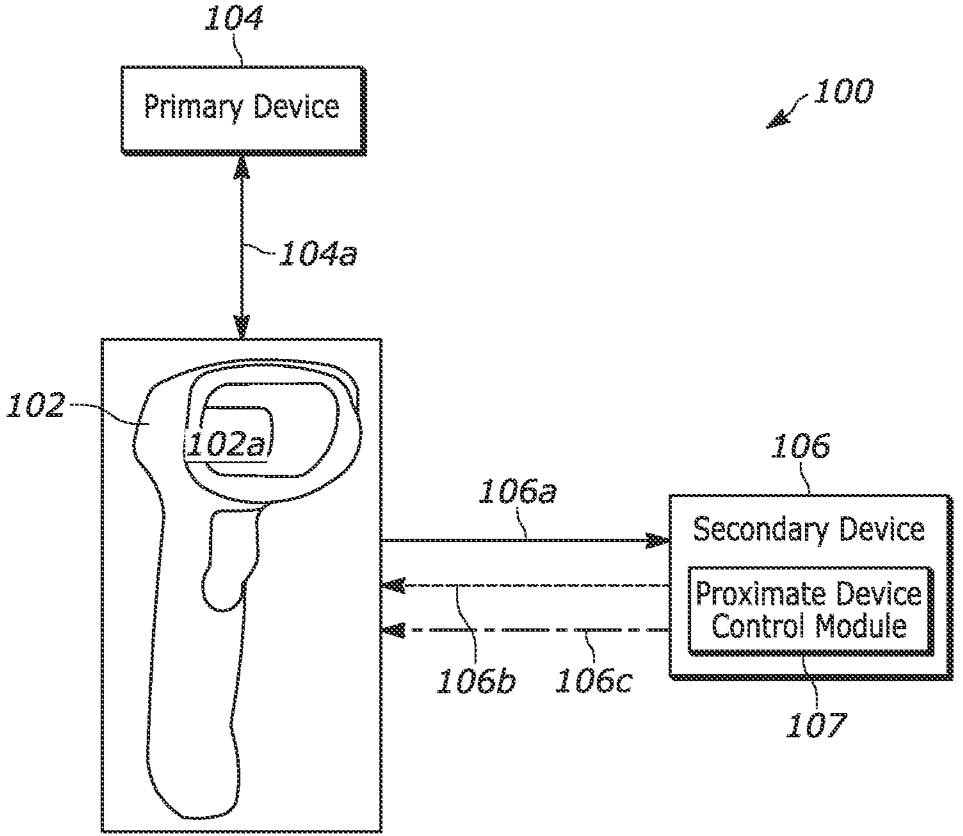
FIG. 1A depicts an example scanning device, primary device, and a secondary device configured to establish a secondary connection with the example scanning device, in accordance with embodiments described herein.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

As previously mentioned, conventional techniques for controlling and/or otherwise managing handheld scanning devices suffer from several issues. For example, conventional remote control techniques typically require the handheld scanning device be connected to a wired host device, such as a charging cradle or workstation. If the scanning device lacks such a connection the wired host device, the handheld scanning devices may be invisible to the conventional control systems, preventing remote control or monitoring. Further, communications between the handheld scanning device and wired host device frequently rely on polling the handheld scanning device, which can overburden the host device and thereby degrade the host device's performance when processing control instructions simultaneously with other data received from the handheld scanning device.

Thus, it is an objective of the present disclosure to eliminate these and other problems with such conventional techniques by providing devices and methods for improved proximate device control. The devices and methods of the present disclosure may ensure that scanning devices receive adequate processing bandwidth for all functionality (e.g., remote management/control, data decoding, etc.), such that each scanning device may be more reliably managed and controlled and host devices are not overburdened. In this manner, the devices and methods of the present disclosure may provide more reliable and effective remote device control than conventional techniques, and may reduce host latency issues experienced in conventional systems by siphoning device management/control functions to secondary devices.

In accordance with the above, and with the disclosure herein, the present disclosure includes improvements in computer functionality or in improvements to other technologies at least because the present disclosure describes that, e.g., device control systems, and their related various components, may be improved or enhanced with the disclosed methods and systems that provide accurate, reliable, and efficient remote device control for respective users and administrators. That is, the present disclosure describes improvements in the functioning of a device control system itself or "any other technology or technical field" (e.g., the field of device control systems) because the disclosed methods and devices improve and enhance operation of device control systems by introducing improved device connection and data transmission techniques that reduce and/or eliminate many inefficiencies typically experienced over time by device control systems lacking such methods and devices. This improves the state of the art at least because such previous device control systems can be inefficient and unreliable due to issues associated with wired host connection requirements, communications via polling, and limited data processing/transmission bandwidth.

In addition, the present disclosure includes applying various features and functionality, as described herein, with, or by use of, a particular machine, e.g., a proximate device, a primary/secondary device, and/or other hardware components as described herein.

Moreover, the present disclosure includes specific features other than what is well-understood, routine, conventional activity in the field, or adding unconventional steps that demonstrate, in various embodiments, particular useful applications, e.g., receiving a signal from a proximate device when the proximate device satisfies a distance threshold, the signal including a dataset corresponding to the proximate device, and the proximate device having a primary connection to a primary device; analyzing the dataset to determine whether the proximate device requires control; and/or in response to determining that the proximate device requires control, establishing a secondary connection to the proximate device, among others.

Turning to the Figures, FIG. 1A depicts an exemplary remote control/management scenario 100 including an example scanning device 102, a primary device 104, and a secondary device 106. The example scanning device 102 may be, for example, a handheld scanning device configured to capture image data of indicia (e.g., barcodes, quick response (QR) codes, etc.). In the exemplary remote control/management scenario 100, the example scanning device 102 may establish and/or otherwise maintain a primary connection 104*a* with the primary device 104. The example scanning device 102 may transmit data to the primary device 104, such as data including and/or related to captured indicia image data. The primary device 104 may receive the transmitted data from the example scanning device 102 and may perform various functions related to the transmitted data (e.g., retrieving product information related to the decoded indicia).

As part of this exemplary remote control/management scenario 100, the example scanning device 102 may periodically emit a beacon or other similar transmission (e.g., signal 106*a*) via beacon transmitter 102*a* that may be received by any proximate device (e.g., secondary device 106). The signal 106*a* may be, for example, a Bluetooth® low energy (BLE) beacon signal configured to transmit certain information corresponding to the example scanning device 102, such as remaining battery life, charging connection status, received signal strength indicator (RSSI) values, asset identification information, etc. In any event, the secondary device 106 may receive this signal 106*a* when the secondary device 106 is within the transmission range of the signal 106*a*, or "proximate", transmitted from the example scanning device 102.

The secondary device 106 may receive the signal 106*a*, analyze the data contained in the signal 106*a* using the proximate device control module 107, and determine whether to establish a secondary connection 106*b*, 106*c* with the example scanning device 102. As mentioned, the signal 106*a* may include any suitable information about the example scanning device 102, and the secondary device 106 may utilize this information to determine whether the example scanning device 102 requires control outside of the communications facilitated by the primary connection 104*a* with the primary device 104. If the secondary device 106 determines that such control is required, then the secondary device 106 may establish a secondary connection 106*b*, 106*c* to the example scanning device 102 to transmit control instructions. The proximate device control module 107 may determine that control is required based on various thresholds corresponding to the information included in the signal 106*a*. The secondary device 106 may be a smartphone, cell phone, mobile computer, smart watch, smart glasses, and/or any other suitable device capable of receiving the signal 106*a* from the example scanning device 102.

As an example, the example scanning device 102 may communicate image data and/or data derived from such image data (e.g., indicia decode data) to the primary device 104 across the primary connection 104*a*, and the secondary device 106 may be within and/or come within the beaconing range of the example scanning device 102. While the example scanning device 102 maintains and/or actively transmits information/data across the primary connection 104*a* to the primary device 104, the beacon transmitter 102*a* may periodically emit the signal 106*a* as a beacon and/or in accordance with any other suitable communications protocol. In certain embodiments, the example scanning device 102 may transmit a first dataset across the primary connection 104*a* to the primary device 104, and at least a portion of the first dataset may not be included in the signal 106*a* transmitted/broadcast from the example scanning device 102. Regardless, the secondary device 106 may receive the signal 106*a*, analyze the dataset included as part of the signal 106*a* using the proximate device control module 107, and may determine that the battery of the example scanning device 102 requires charging.

Namely, the proximate device control module 107 may determine that the remaining battery charge percentage/value (e.g., 10%) indicated in the signal 106*a* is below a remaining battery charge threshold value (e.g., 15%), so the secondary device 106 may determine that the scanning device 102 should be controlled to alert users that the device 102 should be charged soon. The secondary device 106 may establish a secondary connection 106*b* with the example scanning device 102, across which, the secondary device 106 may transmit a control instruction causing the example scanning device 102 to, for example, emit a noise, flash a light, provide haptic feedback, and/or any other suitable output that may alert a user that the example scanning device 102 requires charging.

In the prior example, the secondary device 106 establishes the secondary connection 106*b* with the example scanning device 102 to transmit the control instruction related to a low remaining battery charge. This example control instruction may not require substantial packet size and/or transmission channel bandwidth to transmit quickly to the example scanning device 102, such that the secondary connection 106*b* may be an instant direct connection to the example scanning device 102 via BLE that does not require pairing between the scanning device 102 and the secondary device 106. However, in certain instances, the control instructions may themselves require more bandwidth and/or data packet size than the secondary connection 106*b* can accommodate quickly. Thus, the secondary device 106 may establish the secondary connection 106*c* with the example scanning device 102 to quickly and efficiently transmit these larger control instructions.

For example, the secondary device 106 may receive the signal 106*a* from the example scanning device 102, and the proximate device control module 107 may determine that the example scanning device 102 requires a firmware update. Such an update may require substantial transmission channel bandwidth and/or may include significant data packet size, so the secondary device 106 may establish the secondary connection 106*c* with the example scanning device 102. The secondary device 106 may then transmit the control instruction(s) related to updating the example scanning device 102 firmware across the secondary connection 106*c*. The secondary connection 106*c* may be, for example, a fast file transfer channel having a transmission size limit that is greater than the secondary connection 106*b* (e.g., the instant direct connection via BLE).

In this manner, the secondary device 106 and the proximate device control module 107 may alleviate the processing and bandwidth burdens on the primary device 104 by performing various functions across the secondary connections 106*b*, 106*c* that would otherwise occupy resources of the primary device 104 and/or primary connection 104*a*. For example, the secondary device 106 may control and/or manage the scanning device 102 by (i) tracking a location of the scanning device 102, (ii) defining a geofence for the scanning device 102, (iii) querying attribute information or statistical information of the scanning device 102, (iv) retrieving a log file of the scanning device 102, (v) configuring a setting of the scanning device 102, (vi) updating firmware of the scanning device 102, (vii) activating a function of the scanning device 102, and/or any other suitable action(s) or combinations thereof.

Figure 1B:
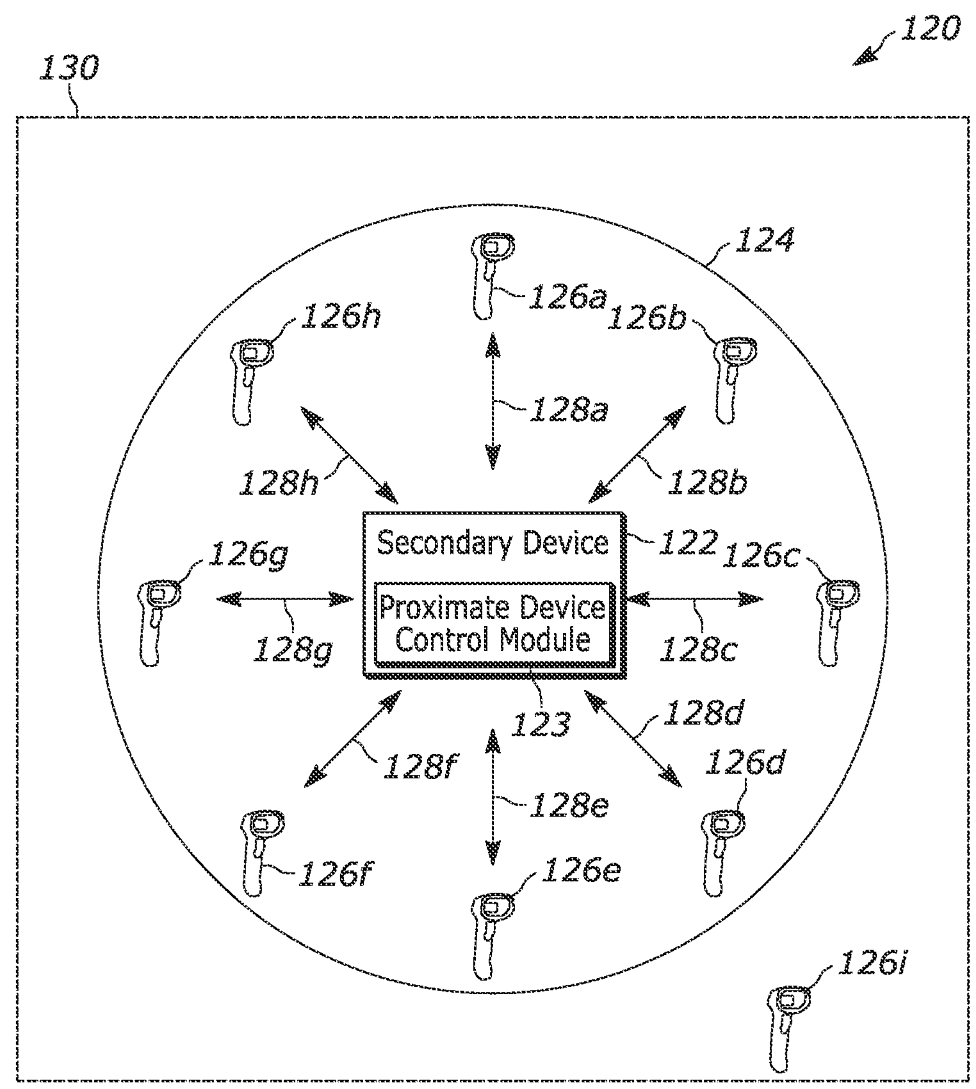
FIG. 1B depicts a plurality of example scanning devices and a secondary device configured to establish secondary connections with each example scanning device that is proximate to the secondary device, in accordance with embodiments described herein.

FIG. 1B is an example environment 120, where techniques for improving proximate device control may be implemented, in accordance with embodiments described herein. The example environment 120 includes a secondary device 122 with a proximate device control module 123 and a proximity threshold 124, multiple scanning devices 126*a-h* with secondary connections 128*a-h* to the secondary device 122, and a scanning device 126*i* that is outside of the proximity threshold 124. The example scanning environment 100 may include a work environment 130, such as a warehouse, a retail store, a hospital, and/or any other suitable location where the multiple scanning devices 126*a-i* and the secondary device 122 may be located.

In certain embodiments, each scanning device 126*a-i* may be a wireless/cordless scanning device. For example, each scanning device 126*a-i* and the secondary device 122 may have integrated transceivers (not shown) and/or other suitable device(s) that enable the device 104*a* and the secondary device 122 to engage in two-way communications, as described herein. These two-way communications may be or include, for example, the secondary device 122 pairing with one or more of the scanning devices 126*a-h* as part of establishing a secondary connection 128*a-h* that accommodates large file transfers (e.g., fast file transfer of secondary connection 106*c*). The two-way communications may also not include pairing (e.g., instant direct connect of secondary connection 106*b*) in instances when the secondary device 122 may transmit smaller files to control the scanning devices 126*a-h*.

Further, the secondary device 122 and the scanning devices 126*a-i* may have wireless signal transceivers (not shown) configured to transmit and/or receive beacon signals, such as BLE beaconing. This beaconing may be or include any of the scanning devices 126*a-i* broadcasting a BLE signal at regular/frequent intervals to allow the secondary device 122 and/or other nearby devices to determine proximity to and/or status of the scanning devices 126*a-i*. In particular, the BLE signal may be structured and/or adhere to any suitable protocol (e.g., iBeacon, Eddystone, AltBeacon), and the advertising packets comprising the BLE signal may include multiple user configurable fields. These user configurable fields may enable users to include specific values in the advertising packets that may inform any devices receiving the BLE signal in a manner desired by the user. For example, and as discussed herein, the user may configure the advertising packets to include indications corresponding to a battery level of the scanning devices 126*a-i* at the time the BLE signal was transmitted. Moreover, it should be appreciated that any suitable type of beaconing, such as Bluetooth® Classic beaconing, Wi-fi Beaconing, active radio frequency identification (RFID) tags, flashing lights, audible tones, and/or combinations thereof may also be used.

In any event, the secondary device 122 may move through the work environment 130 (e.g., carried by a user) and may receive a plurality of signals from a plurality of proximate devices when each respective proximate device satisfies a distance threshold from the secondary device 122. As illustrated in FIG. 1B, each of the scanning devices 126*a-h* may be proximate to the secondary device 122, as each of the scanning devices 126*a-h* is within the proximity threshold 124 of the secondary device 122. In other words, each of the scanning devices 126*a-h* may be close enough to the secondary device 122, such that beacons emitted by the scanning devices 126*a-h* may be received at a receiver (not shown) of the secondary device 122. By contrast, the scanning device 126*i* may not be proximate to the secondary device 122, such that beacons emitted by the scanning device 126*i* may not be received by a receiver of the secondary device 122. The secondary device 122 may receive any suitable number of signals from any suitable number of proximate scanning devices 126*a-h*.

Each signal of the plurality of signals received by the secondary device 122 may include a dataset corresponding to the respective scanning device 126*a-h*. These datasets may generally include any suitable information associated with the respective scanning device 126*a-h*, and may more specifically include information such as: a model number, a serial number, a firmware version, a manufacturing date, a configuration name, a location, a signal strength indicator (e.g., RSSI value), a battery charge value (e.g., remaining battery charge), a charging indicator (e.g., charging, not charging), a motion indicator (e.g., in-motion, static), a cradle docking status, a communication to a host/primary device (e.g., primary device 104), and/or any other suitable information or combinations thereof.

The secondary device 122 may analyze each respective dataset to determine a set of proximate devices from the plurality of proximate devices requiring substantially similar control. In the example environment 120, the secondary device 122 may receive signals (e.g., beacons) from each of scanning devices 126*a-h* and may analyze these signals to determine if any two or more of the scanning devices 126*a-h* require substantially similar control. As referenced herein, "substantially similar control" may indicate that the secondary device (e.g., device 122) may establish a similar and/or identical connection (e.g., instant direct connect, fast file transfer, etc.) with each of the proximate devices requiring the substantially similar control.

For example, the secondary device 122 may analyze the datasets from each scanning device 126*a-h* and determine that scanning devices 126*a-c* are each located outside of a known geofence for those devices 126*a-c*, scanning devices 126*d-f* require a configuration adjustment, and that scanning devices 126*g-h* do not require control. Based on this determination that several groups of the proximate scanning devices 126*a-h* require substantially similar control (or no control), the secondary device 122 may proceed to establish connections with the scanning devices 126*a-h* as necessary. Of course, the secondary device 122 may not establish a two-way connection 128*g-h* with scanning devices 126*g-h* in these instances where the devices 126*g-h* do not require control.

Continuing the prior example, the secondary device 122 may establish an instant direction connection 128*a*-128*c* with each of scanning devices 126*a-c* to transmit a control instruction to each device 126*a-c* to, for example, emit some form of feedback (e.g., audible sound, visible light, vibration, etc.) so that the devices 1216*a-c* may be located and brought back to within the established respective geofences. Additionally, or alternatively, the secondary device 122 may display or otherwise communicate an alert to the user currently utilizing the secondary device 122 that the scanning devices 126*a-c* are located outside of their respective geofences. The secondary device 122 may also transmit an alert to a backend server indicating that each of the scanning devices 126*a-c* has been placed outside of the established geofence, and the backend server may record/store this alert as part of tracking the location(s) of the scanning devices 126*a-c*.

Further in the prior example, the secondary device 122 may establish a fast file transfer connection 128*d-f* with each of the scanning devices 126*d-f* to transmit a control instruction causing the devices 126*d-f* to alter/adjust a configuration setting(s) of the devices 126*d-f*. The scanning device 126*d* may be located in an area of the work environment 130 where loud audio outputs are not allowed, such that the control instruction transmitted to the scanning device 126*d* across the connection 128*d* may cause the device 126*d* to reduce the volume of any audio outputs. The scanning device 126*e* may be located in an area of the work environment 130 where bright lights are not allowed, such that the control instruction transmitted to the scanning device 126*e* across the connection 128*e* may cause the device 126*e* to reduce the intensity/magnitude of any output illumination. The scanning device 126*f* may be located in an area of the work environment 130 where QR codes are more commonly imaged than barcodes, such that the control instruction transmitted to the scanning device 126*f* across the connection 128*f* may cause the device 126*f* to adjust the indicia imaging/decoding parameters from barcode-optimized to QR code-optimized.

Thus, as described in the prior examples, the secondary device 122 may also transmit a control instruction to each proximate device of the set of proximate devices across the respective secondary connections to control each proximate device of the set of proximate devices. As mentioned, each of the secondary connections 128*a-h* may be any suitable connection (e.g., instant direct connection via BLE, fast file transfer, etc.) having any suitable data packet size limits, transmission rates, bandwidth limitations, and/or other suitable parameters or combinations thereof. The secondary device 122 may also transmit control instructions across these secondary connections to perform any suitable control functions. For example, the control instructions may cause and/or otherwise result in (i) tracking a location of a scanning device, (ii) defining a geofence for a scanning device, (iii) querying attribute information or statistical information of a scanning device, (iv) retrieving a log file of a scanning device, (v) configuring a setting of a scanning device, (vi) updating firmware of a scanning device, (vii) activating a function of a scanning device, and/or any other suitable functions or combinations thereof.

It should be understood that the scanning devices (e.g., scanning devices 102, 126*a-i*) and secondary devices (e.g., secondary device 106, 122) described herein are for the purposes of discussion only. The techniques described herein may be used to simultaneously control, manage, and/or otherwise track any suitable number of scanning devices and/or other suitable devices, and such devices may connect and/or otherwise transmit beacon signals to any suitable number of secondary devices and/or other suitable devices (e.g., Internet of Things (IoT) bridge).

Figure 2:
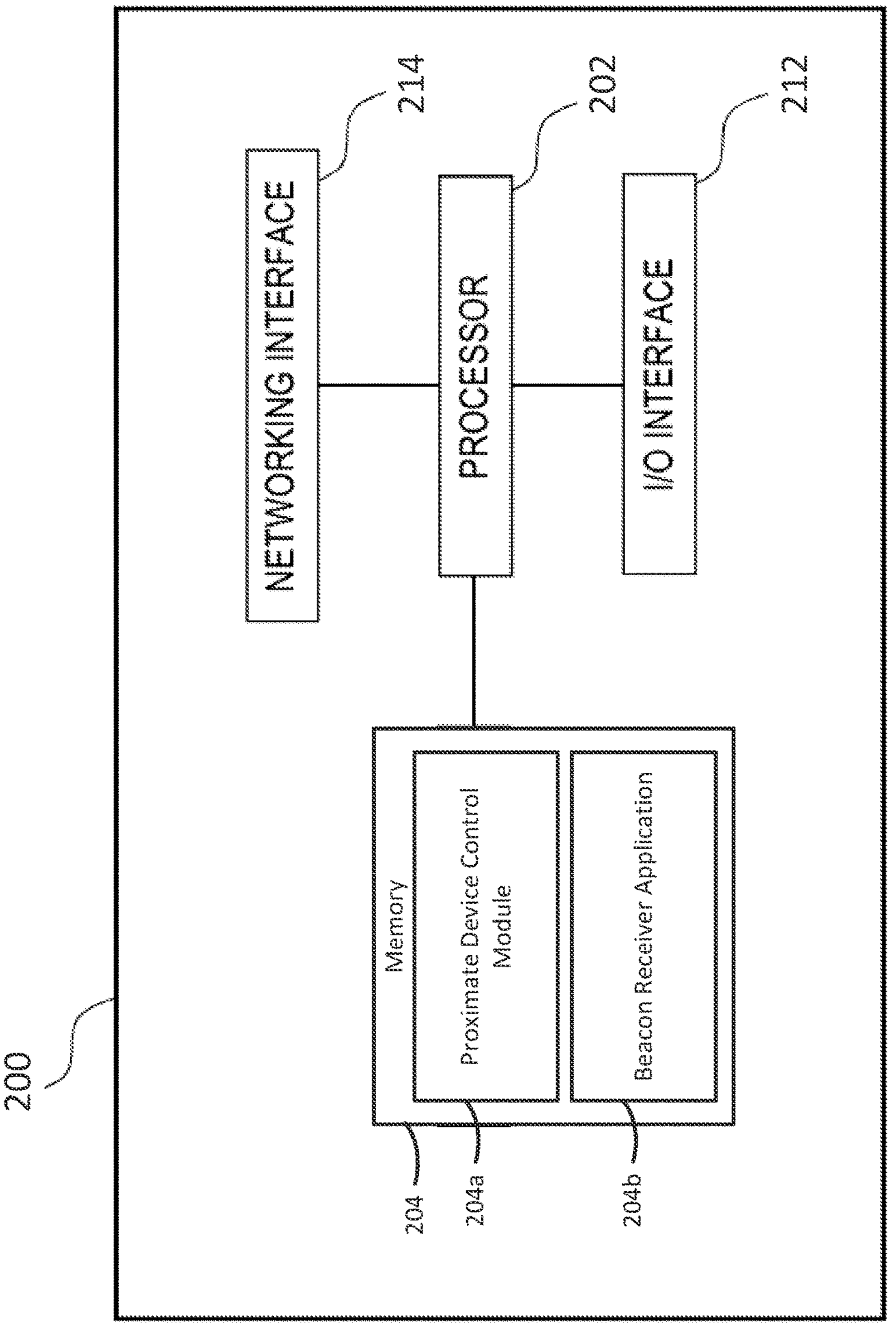
FIG. 2 is a block diagram of an example logic circuit for implementing example methods and/or operations described herein.

FIG. 2 is a block diagram representative of an example logic circuit capable of implementing, for example, one or more components of the secondary device 106 of FIG. 1. The example logic circuit of FIG. 2 is a processing platform 200 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 200 of FIG. 2 includes a processor 202 such as, for example, one or more microprocessors, controllers, and/or any suitable type of processor. The example processing platform 200 of FIG. 2 includes memory (e.g., volatile memory, non-volatile memory) 204 accessible by the processor 202 (e.g., via a memory controller). The example processor 202 interacts with the memory 204 to obtain, for example, machine-readable instructions stored in the memory 204 corresponding to, for example, the operations represented by the flowcharts of this disclosure. The memory 204 also includes a proximate device control module 204*a* and a beacon receiver application 204*b* that are accessible by the example processor 202.

The proximate device control module 204*a* may comprise or represent rule-based instructions, an artificial intelligence (AI) and/or machine learning-based model(s), and/or any other suitable algorithm architecture or combination thereof configured to, for example, perform device control operations for a scanning device (e.g., scanning device 102). To illustrate, the example processor 202 may access the memory 204 to execute the proximate device control module 204*a* and determine whether a proximate device requires control and what control instruction to provide the proximate device. More generally, the proximate device control module 204*a* may include executable instructions configured to analyze a dataset included as part of a signal received from a proximate device and determine whether and how the proximate device requires control. After determining whether and how the proximate device requires control, the proximate device control module 204*a* may also generate and/or otherwise inform a control instruction configured to perform and/or otherwise cause the proximate device to perform the determined control.

The beacon receiver application 204*b* may comprise or represent rule-based instructions, an artificial intelligence (AI) and/or machine learning-based model(s), and/or any other suitable algorithm architecture or combination thereof configured to, for example, receive and interpret signals received from proximate devices. As an example, the beacon receiver application 204*b* may include executable instructions configured to interpret data packets structured in conformance with a BLE beaconing communication protocol and/or any other suitable communication protocol. To illustrate, the example processor 202 may access the memory 204 to execute the beacon receiver application 204*b* and interpret a BLE beacon signal received via the networking interface 214.

Additionally, or alternatively, machine-readable instructions corresponding to the example operations described herein may be stored on one or more removable media (e.g., a compact disc, a digital versatile disc, removable flash memory, etc.) that may be coupled to the processing platform 200 to provide access to the machine-readable instructions stored thereon.

The example processing platform 200 of FIG. 2 also includes a networking interface 214 to enable communication with other machines via, for example, one or more networks. The example networking interface 214 includes any suitable type of communication interface(s) (e.g., wired and/or wireless interfaces) configured to operate in accordance with any suitable protocol(s) (e.g., BLE, Wi-fi, Ethernet for wired communications and/or IEEE 802.11 for wireless communications). For example, the example processing platform 200 may be communicatively connected with a proximate device (e.g., scanning devices 102, 216*a*-*h*) through the networking interface 214, such that the platform 200 may transmit/receive data to/from the proximate device. Additionally, the processors 202 may execute instructions of the proximate device control module 204*a* and/or the beacon receiver application 204*b* stored in memory 204 to receive and interpret beacon signals and to transmit control instructions to proximate devices via the networking interface 214.

The example processing platform 200 of FIG. 2 also includes input/output (I/O) interfaces 212 to enable receipt of user input and communication of output data to the user. Such user input and communication may include, for example, any number of keyboards, mice, USB drives, optical drives, screens, touchscreens, etc. The I/O interfaces 212 may enable a user to input data, such as a desired geofence boundaries, configuration settings, battery charging/charge settings, which the processors 202 may use to determine control instructions for proximate devices, in accordance with instructions included as part of the proximate device control module 204*a* and/or the beacon receiver application 204*b*.

Of course, it should be appreciated that, while the various components of the example processing platform 200 (e.g., processors 202, memory 204, etc.) are illustrated in FIG. 2 as single components, the example processing platform 200 may include multiple of each of the components.

Figure 3A:
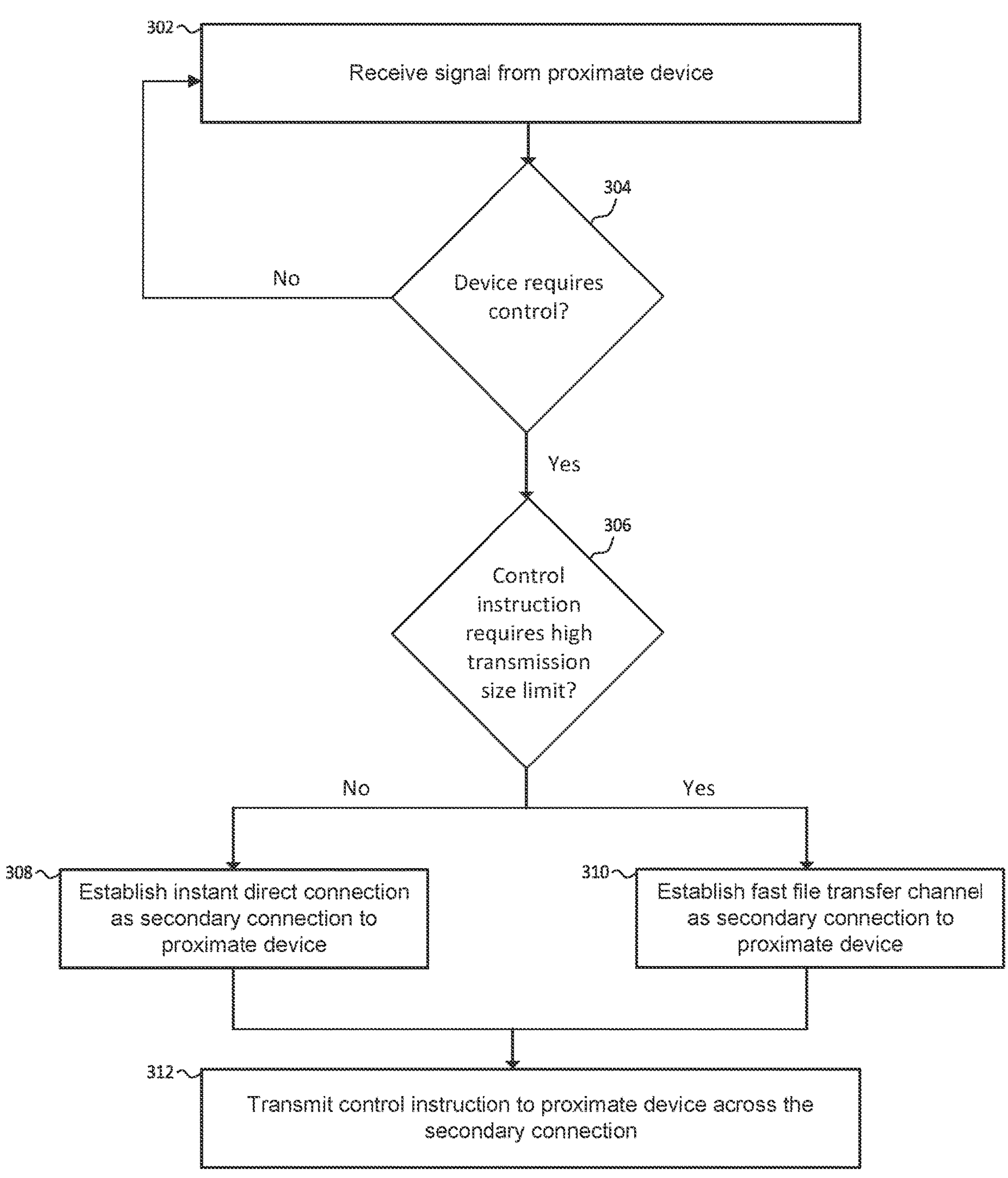
FIGS. 3A and 3B are flowcharts representative of various methods for improving proximate device control, in accordance with embodiments described herein.

FIG. 3A is a flowchart representative of a method 300 for improving proximate device control, in accordance with embodiments described herein. It is to be understood that any of the steps of the method 300 may be performed by, for example, the secondary device 106, a proximate device (e.g., scanning device 102), and/or any other suitable components, components contained therein, and/or combinations thereof discussed herein.

At block 302, the method 300 includes receiving a signal from a proximate device when the proximate device satisfies a distance threshold. The signal may include a dataset corresponding to the proximate device, and the proximate device may have a primary connection to a primary device. The method 300 may further include analyzing the dataset to determine whether the proximate device requires control (block 304). For example, the secondary device may analyze the dataset included as part of the transmitted signal (e.g., beacon) and determine that a remaining battery charge of the proximate device fails to satisfy a battery charge threshold. The secondary device may thereby determine that the proximate device requires charging, such that the proximate device may also require control to cause the proximate device to, for example, turn off certain functions (e.g., indicia decoding components) to preserve the remaining battery charge, output an alert signal (e.g., flashing light, audio output, haptic feedback) indicating the low battery charge, and/or any other suitable control or combinations thereof.

If the secondary device determines that the proximate device does not require control (NO branch of block 304), then the method 300 may include returning to block 302. The proximate device may continue emitting beacons and/or other suitable signals to be received by the secondary device, and the secondary device may continue receiving the signals while the secondary device is within receiving range of the signals. For example, the proximate device may periodically emit a signal/beacon every second, millisecond, several milliseconds/seconds, minute, several minutes, and/or any other suitable frequency. However, if the secondary device determines that the proximate device requires control (YES branch of block 304), the method 300 may include establishing a secondary connection to the proximate device. As part of establishing the secondary connection, the secondary device may determine whether the control instruction associated with the control required by the proximate device requires a high transmission size limit (block 306). If the secondary device determines that the proximate device does not require a secondary connection with a high transmission size limit (NO branch of block 306), then the method 300 may further include establishing an instant direct connection as a secondary connection to the proximate device (block 308). Alternatively, if the secondary device determines that the proximate device requires a secondary connection with a high transmission size limit (YES branch of block 306), then the method 300 may further include establishing a fast file transfer channel as a secondary connection to the proximate device (block 310).

More specifically, at block 306, the secondary device may determine whether the control instruction may require a secondary connection configured to accommodate a high data packet size (e.g., measured in KB, MB, GB, etc.) and/or a high transmission bandwidth (e.g., measured in Kbps, Mbps, etc.). As mentioned, a high data packet size and/or a high transmission bandwidth may be a packet size and/or transmission bandwidth sufficient to quickly/efficiently transmit control instructions configured to, e.g., update device firmware, debug device logs, upload large configuration files, and/or any other suitable functions or combinations thereof. Such a secondary connection may also include pairing the secondary device with the proximate device to complete such control instruction transmission.

By contrast, a lower data packet size and/or transmission bandwidth may be a packet size and/or transmission bandwidth sufficient to quickly/efficiently transmit control instructions configured to, e.g., control a function (e.g., illumination, audio outputs, paging, haptic feedback) of the device, adjust a configuration of the device, query parameters and/or retrieve statistics about the device, and/or any other suitable functions or combinations thereof. Such a lower packet size/transmission bandwidth secondary connection may not include pairing the secondary device with the proximate device.

In any event, when the secondary device establishes the secondary connection to the proximate device, the method 300 may further include the secondary device transmitting the control instruction to the proximate device across the secondary connection (block 312). As previously mentioned, the control instruction may include and/or correspond to any suitable control function, such as: (i) tracking a location of the proximate device, (ii) defining a geofence for the proximate device, (iii) querying attribute information or statistical information of the proximate device, (iv) retrieving a log file of the proximate device, (v) configuring a setting of the proximate device, (vi) updating firmware of the proximate device, (vii) activating a function of the proximate device, and/or any other suitable function or combinations thereof.

Moreover, while the secondary device establishes and/or maintains the secondary connection with the proximate device, the proximate device may continue to transmit data across a primary connection to a primary device. These data transmissions across the primary connection may be or include, e.g., image data, decode data, and/or other suitable data or combinations thereof to a primary device (e.g., Point of Sale (POS), workstation, central server, etc.) configured to receive/process such data. In certain embodiments, the proximate device is configured to transmit a first dataset across the primary connection to the primary device, and at least a portion of the first dataset (e.g., image data, decode data) is not included in the signal (e.g., beacon) transmitted from the proximate device to the secondary device. Thus, the proximate device may maintain and/or transmit data across the primary connection to the primary device before, during, and/or after the secondary device establishes, maintains, and/or transmits control instructions across the secondary connection, as described in reference to the method 300.

In certain embodiments, the secondary connection may comprise at least one of: (i) an instant direct connection to the proximate device via a Bluetooth® Low Energy (BLE) protocol having a first transmission size limit or (ii) a fast file transfer channel having a second transmission size limit that is greater than the first transmission size limit. Further, in some embodiments, the signal may be a BLE signal transmitted by the proximate device as a periodic beacon.

Figure 3B:
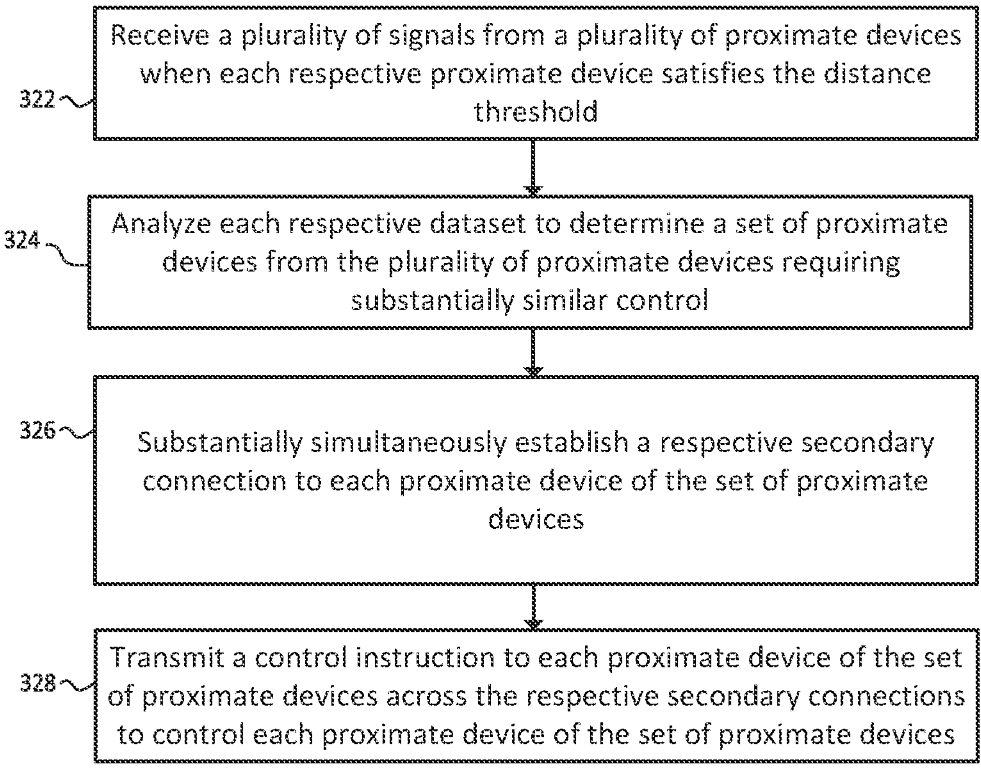

FIG. 3B is a flowchart representative of a method 320 for improving proximate device control, in accordance with embodiments described herein. It is to be understood that any of the steps of the method 320 may be performed by, for example, the secondary device 106, a proximate device (e.g., scanning device 102), and/or any other suitable components, components contained therein, and/or combinations thereof discussed herein.

At block 322, the method 320 may include receiving a plurality of signals from a plurality of proximate devices when each respective proximate device satisfies the distance threshold. Each respective signal of the plurality of signals may include a respective dataset corresponding to the respective proximate device. For example, a first proximate device, a second proximate device, and a third proximate device may each transmit signals received at a secondary device. The signal transmitted by the first proximate device may include a first respective dataset indicating that the first proximate device has 90% remaining battery life, is located within the established geofence for the first proximate device, and that the first proximate device is not currently charging. The signal transmitted by the second proximate device may include a second respective dataset indicating that the second proximate device has 15% remaining battery life, is located within the established geofence for the second proximate device, and that the second proximate device is not currently charging. The signal transmitted by the third proximate device may include a third respective dataset indicating that the third proximate device has 55% remaining battery life, is located outside the established geofence for the third proximate device, that the third proximate device is currently moving, and that the third proximate device is not currently disposed in a cradle.

The method 320 may further include analyzing each respective dataset to determine a set of proximate devices from the plurality of proximate devices requiring substantially similar control (block 324). Continuing the prior example, the secondary device may determine that the first proximate device does not require control, the second proximate device requires control to charge the device, and the third proximate device requires control to re-locate the device into the boundaries of the established geofence. Accordingly, the secondary device may determine that the second and third proximate devices require substantially similar control because both devices require control that may be accomplished using a secondary connection with similar transmission size limits (e.g., packet size, bandwidth limitations).

The method 320 may further include substantially simultaneously establishing a respective secondary connection to each proximate device of the set of proximate devices (block 326). Further in the prior example, the secondary device may substantially simultaneously establish an instant direct connection as a secondary connection to both the second proximate device and the third proximate device. Of course, the secondary device may not establish a secondary connection to the first proximate device, as the secondary device determined that the first proximate device does not currently require control.

The method 320 may further include transmitting a control instruction to each proximate device of the set of proximate devices across the respective secondary connections to control each proximate device of the set of proximate devices (block 328). Continuing the prior example, the secondary device may transmit a control instruction to the second proximate device across the secondary connection to the second proximate device causing the second proximate device to alert a user that the battery requires charging and/or to perform other functions that may preserve battery life (e.g., deactivating decoding functionality). The secondary device may also transmit a control instruction to the third proximate device across the secondary connection to the third proximate device causing the third proximate device to alert a user (e.g., via visual outputs, audio outputs, haptic outputs, etc.) that the third proximate requires re-location to an area within the established geofence and/or to perform other functions that may assist in re-locating the third proximate device (e.g., emitting visual, verbal, haptic-based directions to the established geofence area).

Of course, it is to be appreciated that the actions of any of the methods 300, 320 may be performed any suitable number of times, and that the actions described in reference to any of the methods 300, 320 may be performed any suitable number of times and in any suitable order.

ADDITIONAL CONSIDERATIONS

The above description refers to a block diagram of the accompanying drawings. Alternative implementations of the example represented by the block diagram includes one or more additional or alternative elements, processes and/or devices. Additionally, or alternatively, one or more of the example blocks of the diagram may be combined, divided, re-arranged or omitted. Components represented by the blocks of the diagram are implemented by hardware, software, firmware, and/or any combination of hardware, software and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms “tangible machine-readable medium,” “non-transitory machine-readable medium” and “machine-readable storage device” is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms “tangible machine-readable medium,” “non-transitory machine-readable medium” and “machine-readable storage device” is expressly defined to exclude propagating signals. That is, as used in any claim of this patent, none of the terms “tangible machine-readable medium,” “non-transitory machine-readable medium,” and “machine-readable storage device” can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover, in this document, relational terms such as first and second, top and bottom, and the like may be used solely to distinguish one entity or action from another entity or action without necessarily requiring or implying any actual such relationship or order between such entities or actions. The terms “comprises,” “comprising,” “has”, “having,” “includes”, “including,” “contains”, “containing” or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by “comprises . . . a”, “has . . . a”, “includes . . . a”, “contains . . . a” does not, without more constraints, preclude the existence of additional identical elements in the process, method, article, or apparatus that comprises, has, includes, contains the element. The terms “a” and “an” are defined as one or more unless explicitly stated otherwise herein. The terms “substantially”, “essentially”, “approximately”, “about” or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term “coupled” as used herein is defined as connected, although not necessarily directly and not necessarily mechanically. A device or structure that is “configured” in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A device for improving proximate device control, the device comprising:
one or more processors; and
one or more memories storing instructions thereon that, when executed by the one or more processors, are configured to cause the device to:
receive a signal from a proximate device when the proximate device satisfies a distance threshold, the signal including a dataset corresponding to the proximate device, and the proximate device having a primary connection to a primary device,
analyze the dataset to determine whether the proximate device requires control, and
in response to determining that the proximate device requires control, establish a secondary connection to the proximate device.

2. The device of claim 1, wherein the secondary connection comprises at least one of: (i) an instant direct connection to the proximate device via a Bluetooth Low Energy (BLE) protocol having a first transmission size limit or (ii) a fast file transfer channel having a second transmission size limit.

3. The device of claim 2, wherein the second transmission size limit is greater than the first transmission size limit.

4. The device of claim 1, wherein the instructions, when executed by the one or more processors, further cause the device to:
transmit a control instruction to the proximate device across the secondary connection to control the proximate device based on the dataset corresponding to the proximate device.

5. The device of claim 1, wherein the instructions, when executed by the one or more processors, further cause the device to:
receive a plurality of signals from a plurality of proximate devices when each respective proximate device satisfies the distance threshold, each respective signal of the plurality of signals including a respective dataset corresponding to the respective proximate device,
analyze each respective dataset to determine a set of proximate devices from the plurality of proximate devices requiring substantially similar control,
substantially simultaneously establish a respective secondary connection to each proximate device of the set of proximate devices, and
transmit a control instruction to each proximate device of the set of proximate devices across the respective secondary connections to control each proximate device of the set of proximate devices.

6. The device of claim 1, wherein the signal is a BLE signal transmitted by the proximate device as a periodic beacon.

7. The device of claim 1, wherein the proximate device is configured to transmit a first dataset across the primary connection to the primary device, and at least a portion of the first dataset is not included in the signal transmitted from the proximate device.

8. The device of claim 1, wherein the control includes one or more of: (i) tracking a location of the proximate device, (ii) defining a geofence for the proximate device, (iii) querying attribute information or statistical information of the proximate device, (iv) retrieving a log file of the proximate device, (v) configuring a setting of the proximate device, (vi) updating firmware of the proximate device, and (vii) activating a function of the proximate device.

9. A computer-implemented method for improving proximate device control, the method comprising:
receiving a signal from a proximate device when the proximate device satisfies a distance threshold, the signal including a dataset corresponding to the proximate device, and the proximate device having a primary connection to a primary device;
analyzing the dataset to determine whether the proximate device requires control; and
in response to determining that the proximate device requires control, establishing a secondary connection to the proximate device.

10. The computer-implemented method of claim 9, wherein the secondary connection comprises at least one of: (i) an instant direct connection to the proximate device via a Bluetooth Low Energy (BLE) protocol having a first transmission size limit or (ii) a fast file transfer channel having a second transmission size limit that is greater than the first transmission size limit.

11. The computer-implemented method of claim 9, further comprising:
transmitting a control instruction to the proximate device across the secondary connection to control the proximate device based on the dataset corresponding to the proximate device.

12. The computer-implemented method of claim 9, further comprising:
receiving a plurality of signals from a plurality of proximate devices when each respective proximate device satisfies the distance threshold, each respective signal of the plurality of signals including a respective dataset corresponding to the respective proximate device;
analyzing each respective dataset to determine a set of proximate devices from the plurality of proximate devices requiring substantially similar control;
substantially simultaneously establishing a respective secondary connection to each proximate device of the set of proximate devices; and
transmitting a control instruction to each proximate device of the set of proximate devices across the respective secondary connections to control each proximate device of the set of proximate devices.

13. The computer-implemented method of claim 9, wherein the signal is a BLE signal transmitted by the proximate device as a periodic beacon.

14. The computer-implemented method of claim 9, wherein the proximate device is configured to transmit a first dataset across the primary connection to the primary device, and at least a portion of the first dataset is not included in the signal transmitted from the proximate device.

15. A tangible machine-readable medium comprising instructions for improving proximate device control that, when executed, cause a machine to at least:
receive a signal from a proximate device when the proximate device satisfies a distance threshold, the signal including a dataset corresponding to the proximate device, and the proximate device having a primary connection to a primary device;
analyze the dataset to determine whether the proximate device requires control; and
in response to determining that the proximate device requires control, establish a secondary connection to the proximate device.

16. The tangible machine-readable medium of claim 15, wherein the secondary connection comprises at least one of: (i) an instant direct connection to the proximate device via a Bluetooth Low Energy (BLE) protocol having a first transmission size limit or (ii) a fast file transfer channel having a second transmission size limit that is greater than the first transmission size limit.

17. The tangible machine-readable medium of claim 15, wherein the instructions, when executed, further cause the machine to at least:

transmit a control instruction to the proximate device across the secondary connection to control the proximate device based on the dataset corresponding to the proximate device.

18. The tangible machine-readable medium of claim 15, wherein the instructions, when executed, further cause the machine to at least:

receive a plurality of signals from a plurality of proximate devices when each respective proximate device satisfies the distance threshold, each respective signal of the plurality of signals including a respective dataset corresponding to the respective proximate device;

analyze each respective dataset to determine a set of proximate devices from the plurality of proximate devices requiring substantially similar control;

substantially simultaneously establish a respective secondary connection to each proximate device of the set of proximate devices; and transmit a control instruction to each proximate device of the set of proximate devices across the respective secondary connections to control each proximate device of the set of proximate devices.

19. The tangible machine-readable medium of claim 15, wherein the signal is a BLE signal transmitted by the proximate device as a periodic beacon.

20. The tangible machine-readable medium of claim 15, wherein the proximate device is configured to transmit a first dataset across the primary connection to the primary device, and at least a portion of the first dataset is not included in the signal transmitted from the proximate device.

* * * * *